United States Patent [19]
Parker

[11] 3,757,452
[45] Sept. 11, 1973

[54] FISHING DEVICE

[76] Inventor: George S. Parker, P.O. Box 38, Kailua, Kona, Hawaii 96740

[22] Filed: Mar. 29, 1971

[21] Appl. No.: 128,895

[52] U.S. Cl.................. 43/42.25, 43/4.5, 43/42
[51] Int. Cl............................................ A01k 85/08
[58] Field of Search.................. 43/42.25, 42.28, 43/4.5, 4, 42, 42.7, 42.53

[56] References Cited
UNITED STATES PATENTS

| | | | |
|---|---|---|---|
| 2,594,264 | 4/1952 | Riner | 43/42.28 X |
| 1,476,067 | 12/1923 | Fredricks | 43/42.25 |
| 2,931,123 | 4/1960 | Jensen | 43/42.36 X |
| 3,017,307 | 1/1962 | Halliburton | 43/42.25 X |
| 3,110,979 | 11/1963 | Woodley | 43/44.98 X |
| 2,480,042 | 8/1949 | Nelson | 43/44.4 |

Primary Examiner—Robert W. Michell
Assistant Examiner—John F. Pitrelli
Attorney—William B. Walter

[57] ABSTRACT

A tassle made from thousands of minute but strong fibers has the tassle head attached to a leader and when used at the end of a fish line in co-operation with or even in the absence of a lure head, live bait or spinner this tassle serves to attract fish. When the fish touches the tassle the rough texture of the fish exterior becomes sufficiently adhered to the fibers to allow the fisherman using this device only and without hooks to pull the fish in.

11 Claims, 3 Drawing Figures

PATENTED SEP 11 1973 3,757,452

INVENTOR.
GEORGE S. PARKER
BY William B. Walter
AGENT

FISHING DEVICE

BACKGROUND OF INVENTION

The present invention relates to the type of sport fishing in which a lure at the end of a fishline is drawn through the water by trolling and particularly to a lure used in this manner which not only attracts the fish but serves to attach the fish to the fishline. Although many fish lures generally perform both functions, i.e., attract the fish and attach the fish to the fish line, all previously known such devices use metal hooks for attachment to the fish. In order to perform their function these hooks must be normally drawn into the mouth of the fish and swallowed or depend upon the sensitiveness of the fisherman to the strike to snag the fish by a quick tug on the line. Great care must usually be taken to retain sufficient tension to keep the fish hooked and yet not pulling too hard thus loosening the hook or breaking the line to lose fish, lure, and leader. Control of this tension is obtained by adjustment of the reel drag. The hooks must be small enough to get into the mouth of the fish yet large enough to match the size of fish that might be caught. Since the hook must enter the mouth of the fish the leader to which it is attached should be strong enough to withstand abrasion and the cutting action of the teeth of the fish. With many large fish this precludes the use of a transparent monofilament nylon leader with its advantages of near invisibility. Furthermore the hook is usually partially or fully hidden by a skirt attached to the lure head and trailing therebehind. The whipping action of the skirt often causes it to become wrapped around the hook thus reducing the effectiveness of the lure to either attract or catch fish. Since this is difficult for the fisherman to detect he can troll for hours without knowing that his lure will neither attract or catch fish. The whipping action of the lure head can also cause the hook or hooks to become entangled in the leader ahead of the lure head and thus become ineffective. In areas where seaweeds grow the hook will soon collect strands of seaweed which can also prevent the lure from attracting fish. The hook also causes pain or other forms of discomfort to the fish thus causing him to resist being pulled in to such an extent that in many instances both fish and expensive tackle are lost and the fish may even die even though not brought in to the boat. The hook can also cause bleeding of the fish thus attracting sharks so that in some instances much of the fish has been destroyed by shark before being landed. A billfish for which this present invention has been invented upon being attracted to a lure will approach it and touch it with his bill. Often in sensing the presence of a hook he will leave and the fisherman has lost his opportunity for a catch. A reliable estimate fixes the loss of catch of billfish on a lure using hooks at 80 percent.

SUMMARY OF INVENTION

All of the disadvantages noted above resulting from the use of hooks with the conventional fish lure have been overcome with the hookless lure of the present invention. As will be described in greater detail following, a fisherman using my hookless lure essentially comprising a bundle of strong minute fibers at the end of his line will find that attachment of the fish to the line will depend upon sharp irregularities of the fish exterior rather than the sharpness of a hook.

DRAWING OF PREFERRED EMBODIMENT

The invention is as shown in the accompanying drawings in which.

DESCRIPTION OF PREFERRED EMBODIMENTS

Figure 1:
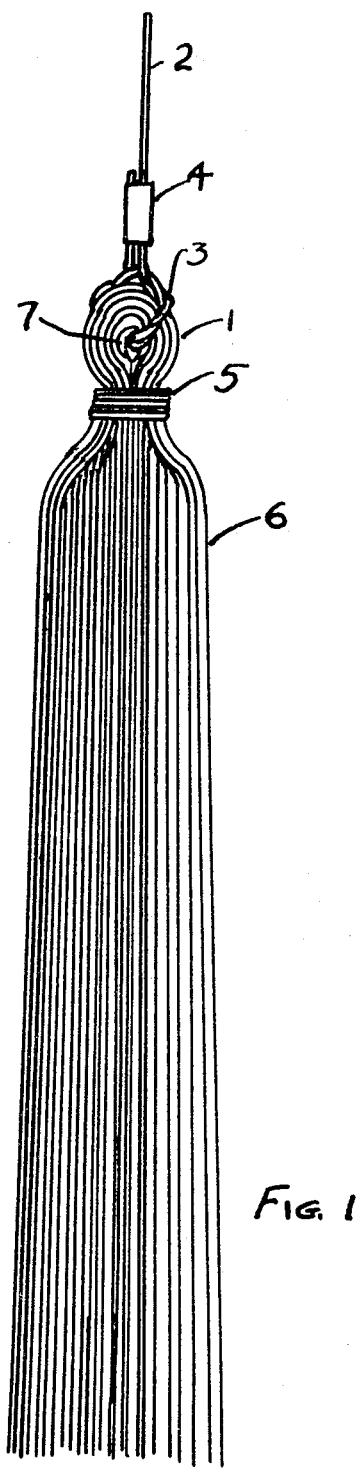
FIG. 1 is a schematic showing of the manner in which the fishing leader is attached to a bundle of fibers. This bundle of fibers is in the form of a tassle which will attract a fish and secure it to the end of a fishline.
Figure 2:
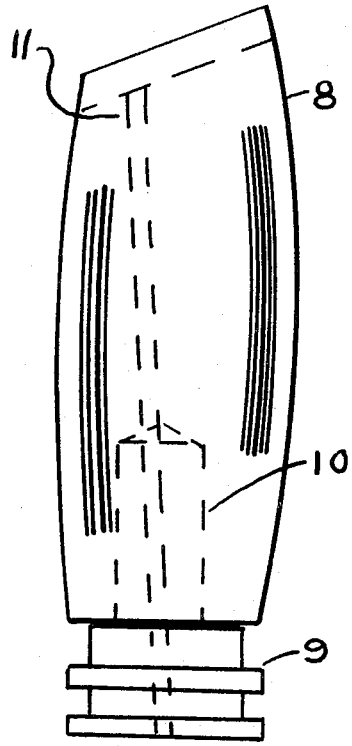
FIG. 2 is a view of the lure head showing the preferred modification required to accept and protect the tassle head and FIG. 3 is a view showing the complete assembly of leader, tassle, and lure head.
Figure 3:
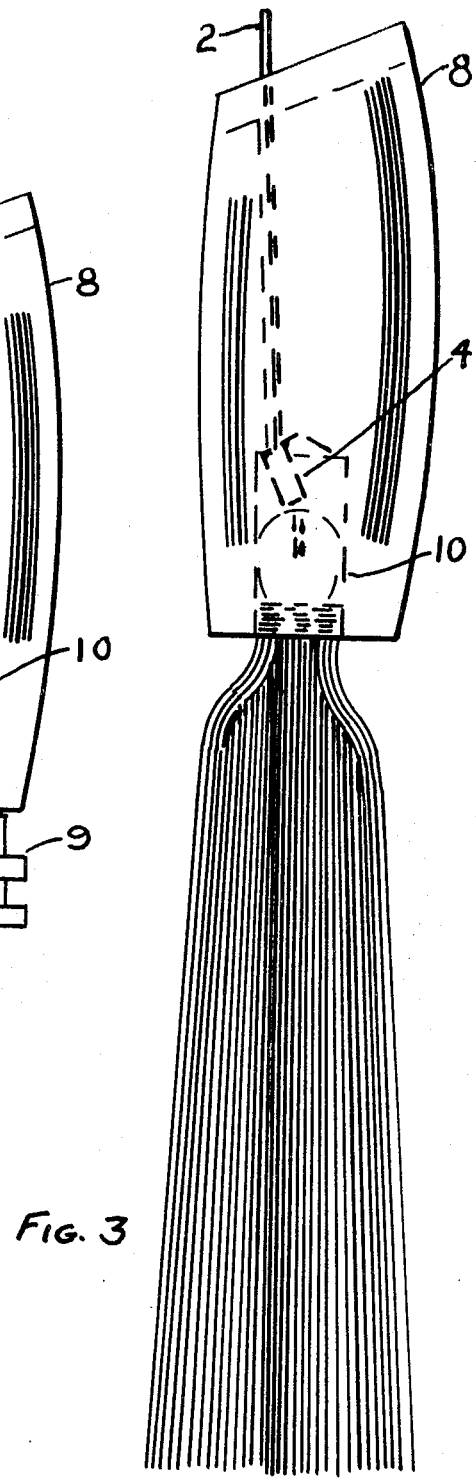

Referring to FIG. 1 of the drawings, the numeral 1 indicates a bundle of thousands of generally parallel strong fibers each of which is very minute being approximately one tenth the diameter of a human hair and each being a continuous length of approximately 15 inches. This bundle of fibers then is about 15 inches long if held out straight but when doubled over midway of its length to form a tassle as shown in FIG. 1 is one-half that length or a tassle length about 7 ½ inches long. Although all the fibers can be white or of one color, the attractiveness of the lure may be enhanced by dyeing groups of fibers red, other groups blue, etc. thus allowing a great variety of color combinations. Numeral 2 indicates a fishing leader and a preferred method of attachment of this leader to the bundle of fibers. The leader can be of any length as selected by the fisherman and in accordance with his experience, skill, and good judgment. However, I prefer to start with a twenty foot length of leader to have sufficient length to progressively discard several of my hookless lures as they become worn or in like manner change lure heads by cutting the leader close to the tassle head, or at the point of the attachment of leader to line. This extends the life of the leader and shortens the time required to get the line back into the water after such a change. It is to be noted that as light a leader as 120 pound test monofilament nylon may be used with this lure in areas such as the Kona Coast of Hawaii where marlin up to 2,000 pounds in weight might be expected to strike the lure. Referring still to numeral 2, it is to be noted that the leader is fashioned into a woven loop 3 about the bundle of fibers at the doubled over point. This woven loop 3 is then drawn tight and the end of the leader 2 secured by a crimped metal sleeve 4 to the length of leader. It should be noted at this point that the entire structure becomes one in which loads are cushioned. Sharp bends of the leader and stress concentrations such as encountered in the attachment of a leader to the eye of a steel hook are completely eliminated. In the absence of such stress concentrations the hookless lure and leader are much less likely to fail structurally and thus lose the fish. I have found in my experiments that nylon fibers such as used in nylon rope are very satisfactory for use in making up the fiber bundle 1 and a piece of such rope can be used as such. However, I recognize that other strong fibers such as polyesters could be equally effective. Primarily, these fibers must be small enough to become attached to the rough surface of a fish and sufficiently strong and tough to not break when under the shock and strain of bringing a fish to the side of a boat. Referring again to FIG. 1 it is shown that the folded over bundle 1 of fibers is held firmly in that position by binding or serving with a fishline 5 close to the leader. I have found that 50 pound test fishline is suitable for this purpose. When securely served by many turns or winds of the fishline 5 the end of the fishline is held in place in customary fashion by interweaving with the turns drawn tight and cut off. At this point of construction we find that the bundle of fibers has been firmly attached to the end of a long monofilament leader 2 forming a tassle 6. Forming a tassle with an eye 7 for later attachment to a leader would likewise serve the function of my hookless lure. I recognize that in the embodiment so far described that I have a fishing device which can serve both functions of my invention: i.e., to attract a fish and to secure it to the end of a fishline. While such a fish lure comprising a tassle at the end of a fishline and leader could so function it is believed that more sophisticated embodiment utilizing any of a great variety of lure heads, spinners, etc, could be more effective in attracting fish. It is also true that this tassle of minute fibers in itself can be used to catch some types of fish in place of a hook. Thus a lure head, spinner, live bait or any combination of same will serve to attract the fish while the tassle serves to attach the fish to the line. FIGS. 2 and 3 show one such embodiment which is described as follows:

Referring now particularly to FIG. 2 an ordinary lure head 8, preferably one which has shown its ability to attract fish by many strikes in the past, has had the trailing end 9 cut off square removing the shoulder provided for attachment of rubber legs and skirt. A socket 10 approximately five eighths of an inch in diameter and about 1 ¼ inches deep is made in the cutoff end for a snug fit with the tassle head. No other modification of the lure head is required. The through hole 11 as already provided in the lure head for passage of the leader is utilized in similar manner as will be seen in FIG. 3.

Referring now to FIG. 3 it is seen that when the complete lure has been assembled at the end of the leader 2 the tassle head has been pulled up into the socket 9 with the metal sleeve 4 bottoming at the end of the socket 9. Since the pull of the fish originates at its attachment to the tassle the load placed on the metal sleeve 4 due to the bottoming of the lure head is very small, being the hydrodynamic drag of the lure head only. As a matter of fact after the fish becomes secured to the tassle, the lure head 8 ordinarily slides forward due to the thrashing of the fish. The bound head of the tassle 6 and its point of attachment to the leader 2 is well protected by the body of the lure head 8 and hidden thereby during trolling prior to the strike. Furthermore, the assembly of lure head and tassle has a very smooth and continuous appearance thus enhancing its ability to attract fish. In the foregoing I have described in detail an effective manner of construction and assembly of my new and improved hookless fish lure. This form of construction functions well and is simple to manufacture by hand or possibly by machine. However, a hookless lure embodying these same principles could well be manufactured in other forms.

MODE OF OPERATION OF INVENTION

In use, the lure assembly including leader 2, lure head 8 and tassle 6 is trolled behind the boat. In fishing for marlin I have found that a speed of 6 or 7 knots is sufficient. Trolling at a faster speed is unnecessary and will only tangle the tassle fibers. Drag on the reel is so set that pull of lure and line at trolling speed is barely offset by drag on reel. As is normal with the conventional lure the action of the lure head is to skip across the waves behind the boat causing splashing and slapping noises which apparently attract the marlin or billfish. As the bill touches the tassle the very minute fibers making up the tassle become securely attached or adhered to the bill. In examining the surface of the bill by microscope one sees not only a rough black scaly surface but a multitude of tiny white teeth projecting at a variety of angles. The motion of the fibers as they are drawn through the turbulent waters and the motion of the bill as it hits the tassle is sufficient to many of the fibers in the small teeth and rough surface of the bill. As the fish attempts to shake loose, more fibers become attached to the bill and the fish becomes more thoroughly secured to the hookless lure. Thus the rough surface of the fish rather than a sharp point or points of a hook or hooks on the line is utilized in co-operation with a multitude of fibers to catch and attach the fish to the line. As described above the drag of the reel has been set with a light braking action and when the fisherman senses that a fish has contacted the lure he should not attempt to strike the fish as he would when using a hook type of lure. There is no need to attempt to secure the fish by a sharp tug as is necessary with the conventional lure. The fisherman should allow the line to run out freely on the preset drag when the fish contacts the lure. At this time the lure head will slide to the line end of the leader removing all weight from the tassle. He should then allow the fish to run out freely for some time similar to fishing with live bait then tighten the reel drag gradually just enough to reel the fish in.

SUMMARY OF ADVANTAGES

Advantages of this hookless lure over the conventional lure employing a hook or hooks are as follows:

1. Fewer Losses of Fish

Almost every strike is a hook up. Marlin that strike and miss will usually keep striking until they become attached because they feel no hooks and never get hurt. Catches are tripled as compared to fishing with hooks. Broken lines are practically eliminated. Pull offs are eliminated, especially at gaff. Losses because of slack line are eliminated.

2. Fighting time is shorter by about 50 percent

The fish is attached to the line at the front end of the bill and is led to the boat as with a long handle with great leverage. He is turned easily. Tail wrapping of the leader has not been experienced. Fishing time for more fish results from the reduced fighting time. Multiple hook ups can be handled without loss.

3. Slower troll

The slower trolling speed allowed when fishing with this hookless lure provides the fisherman with the comforts of reduced engine noise and vibration. Less fuel is used.

4. Lighter and therefore sportier tackle can be used

5. Hooks are unnecessary

Lures troll better, do not become tangled with hooks, don't pickup seaweed, and are not a hazard to people. The time required to sharpen hooks is saved. The fish is not hurt, does not bleed and thus attract sharks, and can be released without injury.

6. Longer tackle life

Broken lines and loss of expensive lure heads are practically eliminated.

7. More fish are attracted

Use of monofilament nylon leader and lack of hooks attract more fish to the lure.

I claim:

1. A hookless billfish lure serving the functions of both attracting and holding a billfish relative to a fishline comprising a tassle-like arrangement of a bundle of thousands of elongated strong minute diameter fibers, each fiber being sufficiently small in diameter to collectively with the other fibers adhere to the rough outer surfaces of the bill of a billfish and thereby cause the fish to be held relative to the fishline, each of said fibers having a diameter less than 0.004 inches, a tassle length of at least 4 inches, and a tensile strength of at least 1.0 ounces.

2. A hookless fish lure as claimed in claim 1 in which said fibers are nylon.

3. A hookless fish lure as claimed in claim 1 in which said tassle-like arrangement is made from a short length of nylon rope.

4. A hookless fish lure as claimed in claim 1 also comprising a means for attaching said tassle-like arrangement to a leader.

5. A hookless fish lure as claimed in claim 4 wherein the means for attaching the tassle-like arrangement to a leader comprises an eye through which the leader may be passed.

6. A hookless fish lure as claimed in claim 4 comprising a leader attached to said means for attaching and a lure head attached to said leader.

7. A hookless fish lure as claimed in claim 4 comprising a leader attached to said means for attaching said tassle-like arrangement to a leader and a lure head having a hole throughout the length of the lure head through which said leader passes.

8. A hookless fish lure as claimed in claim 7 in which said hole throughout the length of the lure head has an enlarged section at the after end to act as a socket to receive the forward end of the tassle-like arrangement.

9. A hookless fish lure as claimed in claim 1 wherein the fibers in said bundle are generally parallel and continuous in length from one end to the other end of the bundle and said tassle-like arrangement is constructed by doubling over the bundle of fibers midway of their length and binding it in this position.

10. A hookless fish lure as claimed in claim 9 in which a leader is secured to the lure by forming a woven loop with the leader about the bundle of fibers at the point of doubling over.

11. A hookless fish lure as claimed in claim 1 wherein said fibers are of a continuous length from end to end of the tassle-like arrangement.

* * * * *